United States Patent [19]
Adachi et al.

[11] Patent Number: 4,970,645
[45] Date of Patent: Nov. 13, 1990

[54] SUSPENSION CONTROL METHOD AND APPARATUS FOR VEHICLE

[75] Inventors: Masao Adachi, Sagamihara; Makoto Shioya, Tokyo; Motohisa Funabashi, Sagamihara; Seiji Suda, Mito; Shotaro Naito, Katsuta, all of Japan

[73] Assignee: Hitachi, Ltd., Tokyo, Japan

[21] Appl. No.: 179,390

[22] Filed: Apr. 8, 1988

[30] Foreign Application Priority Data

Apr. 9, 1987 [JP] Japan .................. 62-87505

[51] Int. Cl.$^5$ .......................... B60G 17/015
[52] U.S. Cl. ...................... 364/424.05; 280/707; 280/703
[58] Field of Search ............... 364/424.05; 280/707, 280/6 R, 6 GH, 6.12, DIG. 1, 703; 180/41

[56] References Cited

U.S. PATENT DOCUMENTS

| | | | |
|---|---|---|---|
| 4,722,547 | 2/1988 | Kishi et al. | 280/707 |
| 4,761,022 | 8/1988 | Ohashi | 280/707 |
| 4,789,935 | 12/1988 | Buma et al. | 364/424.05 |
| 4,809,176 | 2/1989 | Oowa et al. | 280/707 |

FOREIGN PATENT DOCUMENTS 61-143209 of 1986 Japan.

OTHER PUBLICATIONS

*Car & Maintenance*, vol. 39, No. 2, 1985, pp. 41–52.

*Primary Examiner*—P. S. Lall
*Assistant Examiner*—V. Trans
*Attorney, Agent, or Firm*—Fay, Sharpe, Beall, Fagan, Minnich & McKee

[57] ABSTRACT

A suspension control apparatus for a vehicle comprises a measuring unit for measuring relative motion between sprung mass and unsprung mass at each of wheels, a decision unit for discriminatively determining occurrence and convergence of at least one of rolling or pitching and bouncing or unsprung mass vibration on the basis of measurement data available from the measuring unit, and a control unit for controlling at least one of damping coefficient and spring constant in the suspension characteristics on the basis of the result of decision made by the decision unit.

28 Claims, 8 Drawing Sheets

SUSPENSION CONTROL METHOD AND APPARATUS FOR VEHICLE

BACKGROUND OF THE INVENTION

The present invention relates generally to a suspension control for a vehicle and more particularly to suspension control method and apparatus for a vehicle suited for enhancing the comfortableness and manipulatability in driving the vehicle.

Heretofore, it is known to perform a suspension control for ensuring a manipulation stability of the vehicle (motor vehicle) such as an automobile by suppressing the rolling, pitching, bouncing and the like phenomena in the course of running as well as at the times of start and stop. In association with the suspension control, the wheels are connected to the body of car through interposed dampers (shock absorbers) with a view to improving the comfortableness to ride.

A suspension control for the motor vehicle is known in which the damper stroke positions are detected by means of damper stroke sensors to determine damping constants on the basis of the detected values for thereby controlling the variable dampers, as is disclosed in JP-A-61-143209 corresponding to U.S. pat. Ser. No. 681312 filed on Dec. 13, 1984 in the name of General Motors Co. According to this know suspension control, however, the damper control is carried out without discriminatively determining the sprung mass vibration (i.e. vibration of sprung mass) and the unsprung mass vibration (i.e. vibration of unsprung mass), as the result of which difficulty is encountered in assuring improved comfortableness to ride and good manipulatability in driving.

As an attempt to enhance the comfortableness in ride and the manipulatability in driving which are the conditions contradicting each other, there has been developed a so-called electronically controlled suspension system in which the overall control inclusive of controlling the spring constants of air springs and adjustment of height of car in addition to the suspension control can be electronically performed. This type suspension control system tends to be increasingly installed in the motor vehicles. A typical one of such electronic suspension control systems is disclosed, for example, in a Japanese periodical entitled "CAR AND MAINTENANCE", Vol. 39, No. 2, p.p. 41–52 (1985). According to this known control technique, road height sensors and acceleration sensors are mounted for performing the suspension control adaptively in consideration of vibrations in the road level or height and the side wind. Consequently, the control system is necessarily very expensive. Further, it must be pointed out that neither the bouncing nor the unsprung mass vibration can be discriminatively detected. Accordingly, with the suspension control in which no consideration is paid to the abovementioned phenomena, the improvement attainable in the comfortableness and the manipulatability is not to be sufficiently satisfactory.

Further, in the hitherto known suspension control, no consideration is paid to the damper stroke speed at the time of changing over the damper characteristics, giving rise to a problem that sprung mass is subjected to remarkable change in acceleration upon changing-over of the damper characteristics.

SUMMARY OF THE INVENTION

An object of the present invention is to provide a suspension control method and apparatus for a motor vehicle which is immune to the problems of the prior art control systems mentioned above and which can assure improved comfortableness and manipulatability in driving the vehicle despite variations in the road level and the side wind without resorting to the use of expensive sensors.

In view of the above object, there is provided according to an aspect of the present invention a suspension control method and apparatus for a motor vehicle equipped with a member capable of modifying at least one of damping coefficient and spring constant belonging to the suspension characteristics, which comprises sensors for measuring relative motion between sprung mass and unsprung mass at each of the wheels to determine the damper stroke positions, a decision unit for discriminatively determining occurrence and convergence to cessation of at least one of rolling, or pitching, bouncing, and using unsprung mass vibrations on the basis of measurement data available from the sensors and a control unit for controlling at least one of the damping coefficient and spring constant characteristics of the suspension on the basis of the result of the decision made by the decision unit wherein the decision unit discriminatively determines the occurrence of at least one of the pitching, rolling, bouncing, and unsprung mass vibrations on the basis of the measured values available from the measuring unit to thereby cause the modifying member to alter the suspension characteristics.

According to an aspect of the present invention, the relative position between the sprung mass structure and the unsprung mass structure, i.e. the damper stroke position is measured at each of the four wheels by sampling at a sampling period, for example, of shorter than 0.4 second. By virtue of this feature, it is possible to determine which of the natural vibrations of the car body (having a frequency of 1 to 2 Hz) and the natural vibrations of the unsprung mass structure (wheels) which is 10 to 20 Hz in frequency is predominant.

Further, owing to the measurement of the damper stroke position at each of the four wheels, occurrence as well as convergence of the bouncing phenomenon can be detected in addition to the pitching and the rolling due to changes in the road level and the side wind, whereby not only the change-over of the suspension characteristic can be effectuated appropriately but also the optimal timing for the characteristic changing-over can be determined to enhance the comfortableness and manipulatability.

When the unsprung mass vibration caused to take place upon passing or crossing over a joint and a step (offset) in the road is predominant, involving more significant variation in the damper effort than that of the spring, the change-over of the suspension characteristics is carried out at a time point at which the relative speed between the sprung and unsprung mass structures becomes zero, whereby change in acceleration can be smoothed to thereby promote suppression of vibration. Thus, the comfortableness and manipulatability in driving the motor vehicle can be further improved.

BRIEF DESCRIPTION OF THE DRAWINGS

FIGS. 9 and 10 are views for illustrating damper stroke position behaviors upon passing of the vehicle over rising step and falling steps, respectively.

DESCRIPTION OF THE PREFERRED EMBODIMENTS

Now, the present invention will be described in detail in conjunction with examplary and preferred embodiments thereof by reference to the accompanying drawings.

Figure 1:
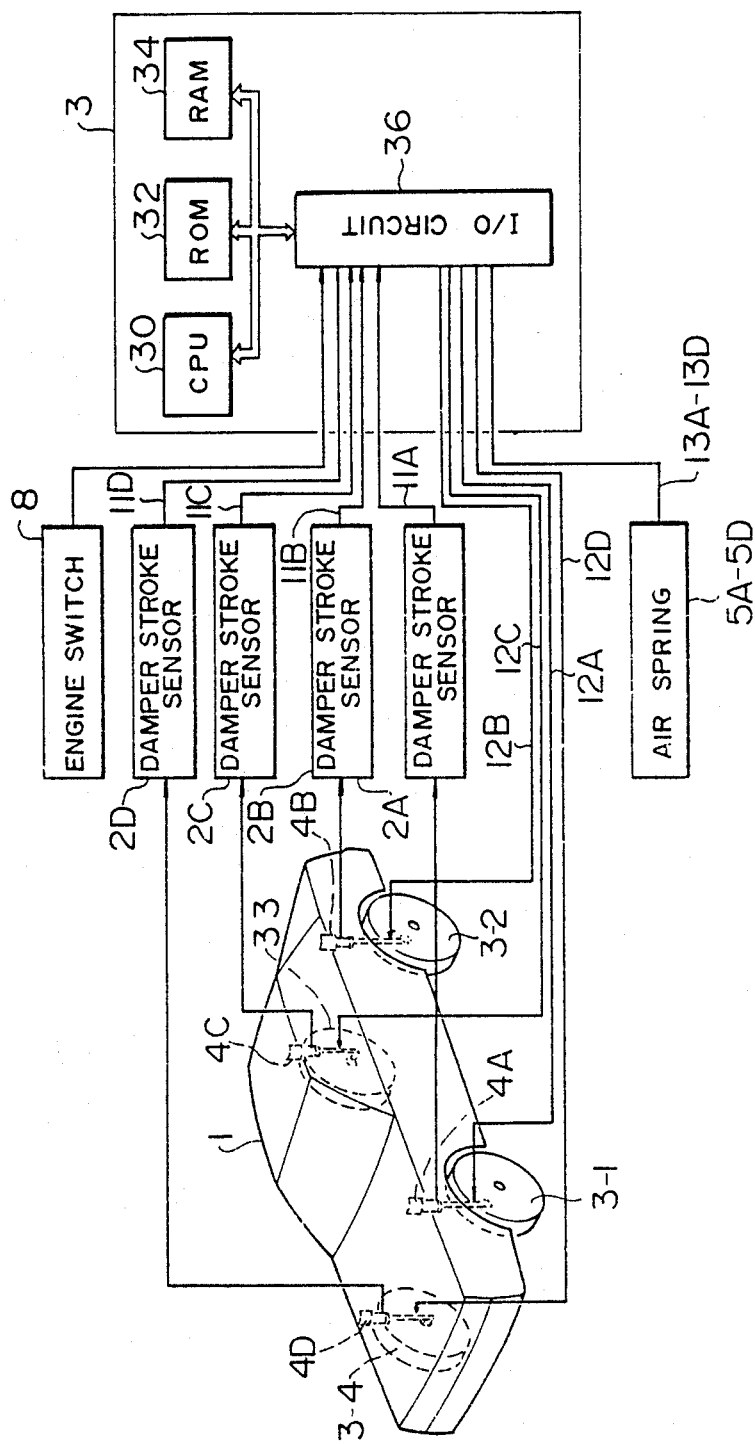
FIG. 1 is a schematic diagram showing a general arrangement of a suspension control apparatus according to an exemplary embodiment of the present invention.

FIG. 1 shows schematically a general arrangement of a suspension control apparatus according to an embodiment of the present invention applied to a passenger motor car.

Referring to the figure, a reference numeral 1 generally denotes the motor car which is subject to the suspension control according to the invention, 3-1 to 3-4 denote wheels, respectively, 4A to 4D denote dampers provided in association with the wheels 3-1 to 3-4, respectively, and having respective changeable damping coefficients, 2A to 2D denote damper stroke sensors provided in association with the dampers 4A to 4D for detecting the stroke positions of the associated dampers, respectively, 5A to 5D denote air springs mounted on the wheels and having changeable spring constants, respectively, 8 denotes an engine key switch, and a numeral 3 denotes a controller adapted to perform arithmetic operations for discriminatively deciding mass sprung rolling, pitching, bouncing and the unsprung mass vibration, determining selectively the optimal suspension state, calculating the time point at which the suspension state is to be changed over and other operations. The controller may preferably be constituted by a microcomputer.

As will be seen in FIG. 1, the controller 3 includes a central processing unit (CPU) 30, a read-only memory (ROM) 32, a random access memory (RAM) 34 and an input/output (I/O) circuit 36.

Further, reference symbols 11A to 11D designate signals produced by the damper stroke sensors 2A to 2D and indicate the measured values of the stroke positions of the associated dampers, respectively, 12A to 12D designate signals commanding the changing-over of the suspension states of the dampers 4A to 4D, and reference symbols 13A to 13D designate signals commanding changing-over of the suspension states of the air springs. Parenthetically, FIG. 1 shows representatively only one of the air springs 5A to 5D.

Each of the dampers 4A to 4D of the motor car 1 has the damping coefficient whose magnitude can be changed, for example, among three values or levels, i.e. large (hard), middle (normal) and small (soft) levels. On the other hand, the spring constant can be changed over, for example, between two different values or levels, i.e. large (hard) and small (soft) level.

The suspension control will be first explained briefly. The signals 11A to 11D produced by the damper stroke sensors 2A to 2D and representing the damper stroke positions measured with measurement accuracy in the range of 0.2 to 2 mm and preferably of 1 mm are sampled and fetched by the controller 3 with a period between 0.001 to 0.04 seconds. The latter processes the measurement data in the manner mentioned above to output the suspension state change-over commands 12A to 12D and 13A to 13D to the dampers 4A to 4D and the air springs 5A to 5D, respectively. In response to these commands, the dampers 4A to 4D and the air springs 5A to 5D change the suspension characteristics to the soft or normal or the hard level correspondingly. In this conjunction, it should be mentioned that the change-over of the damping coefficients of the dampers 4A to 4D is effected simultaneously for the four wheels. Similarly, the spring constants of the air springs 5A to 5D for the four wheels are changed over simultaneously.

Now, the processings executed by the controller or microcomputer 3 which constitutes the heart of the system of the invention will be described in detail by referring to FIG. 2.

Figure 2:
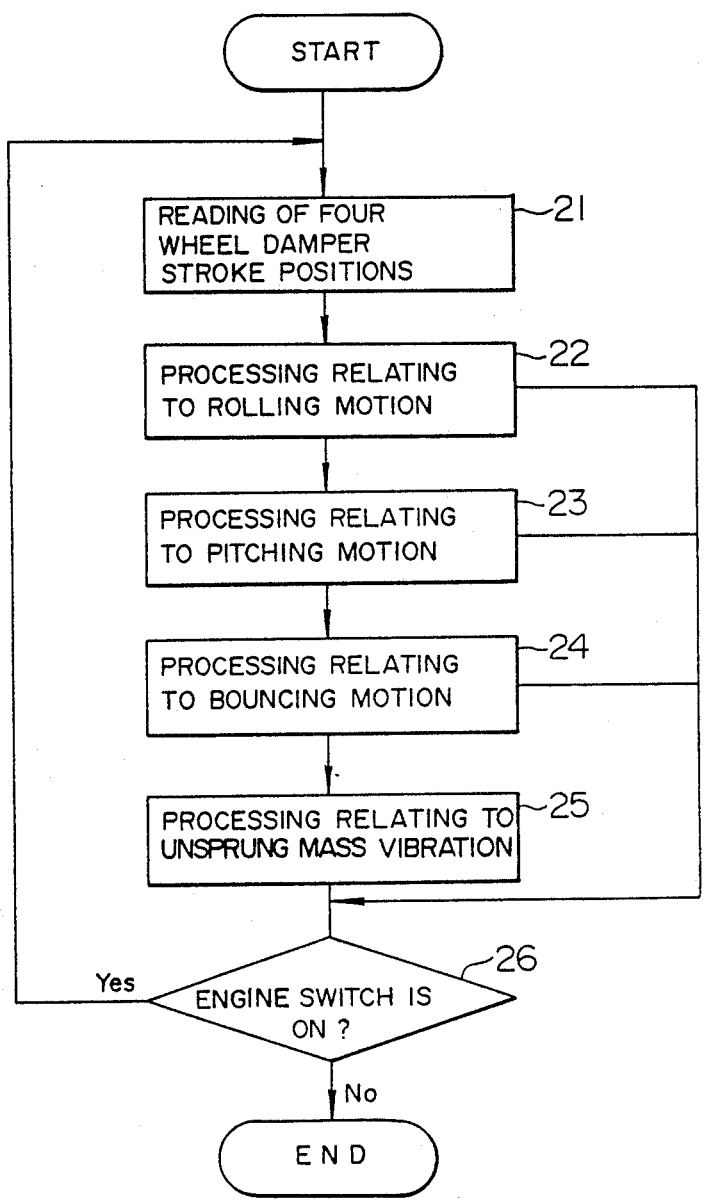
FIG. 2 is a flow chart for illustrating macroprocessings executed by a microcomputer constituting an important part of the suspension control apparatus.

FIG. 2 shows in a macro flow chart of the software-based processing executed by the microcomputer 3. When the engine switch 8 of the motor car 1 is turned on, the microcomputer 3 reads and fetches the stroke positions of the dampers 4A to 4D for the four wheels, respectively, from the associated damper stroke sensors 2A to 2D with an appropriate timing, for example, at every interval of 0.01 second, wherein the position data fetched are stored in the RAM 34 (step 21 in FIG. 2). Subsequently, the microcomputer 3 executes the processing relating to the rolling motion at a step 22, which is followed by execution of the processing relating to the pitching motion at a step 23 and next by execution of the processing relating to the bouncing motion at a step 24 and finally execution of the processing relating to the unsprung mass vibration at a step 25. These processings (steps 21 to 25) are repeatedly executed until the turn-off of the engine switch 8 is detected at a step 26.

In the four wheel damper stroke position reading and fetching processing (step 21), the output values $y_{fl}(t)$, $y_{rl}(t)$, $y_{rr}(t)$ and $y_{fr}(t)$ of the damper sensors 2A to 2D are fetched with precision on the order of 1 mm and stored in the RAM 34.

The output values mentioned above are defined as follows:

$y_{fl}(t)$ stroke position of the damper for the front left wheel at a time point t, $y_{rl}(t)$: stroke position of the damper for the rear left wheel at the time point t, $y_{rr}(t)$ stroke position of the damper for the rear right wheel at the time point t, and $y_{fr}(t)$ stroke position of the damper for the front right wheel at the time point t.

Each value is assigned a plus (+) sign in the damper stretch direction. However, in the static balanced state of the motor car 1, the origin correction is performed so that $y_{fl} = y_{rl} = y_{rr} = y_{fr}$. When the sampling period of the damper stroke position is represented by T, the data obtained before T×k seconds (in the case of the illustrative example, 0.01 k second) are represented by $y_{fl}(t-Tk)$, $y_{rl}(t-Tk)$, $y_{rr}(t-Tk)$ and $y_{fr}(t-Tk)$, respectively, where k represents the number of the samplings of the damper stroke position performed till the present time point. Accordingly, $y_{fl}(t-Tk)$ represents the data obtained through the k-th sampling in the past as counted from the present time point.

Next, description will be directed to the individual processings performed by the microcomputer 3.

Figure 3:
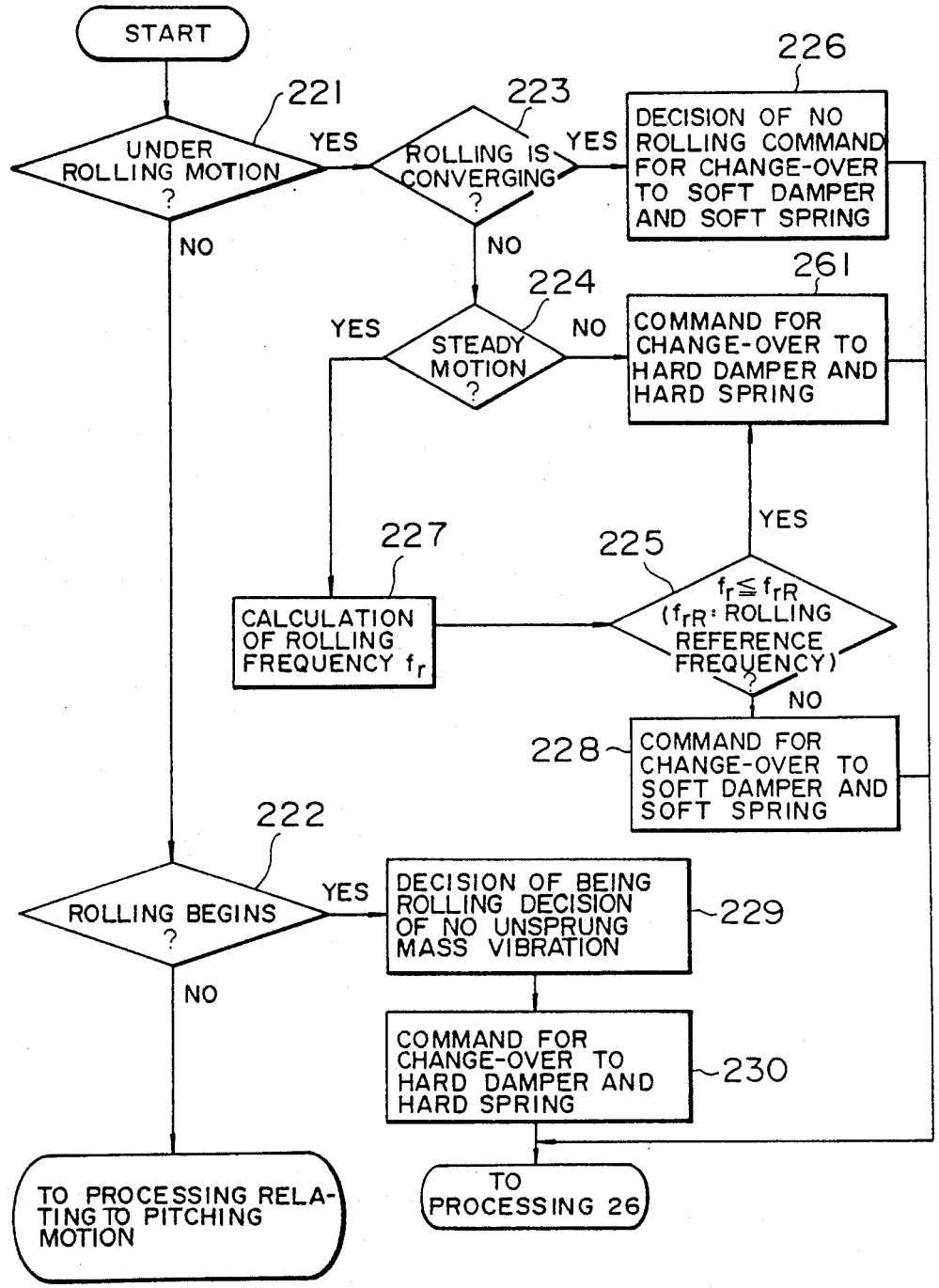
FIG. 3 is a flow chart showing the processing relating to the rolling motion.

FIG. 3 shows a flow chart illustrating in detail the processing relating to the rolling motion (step 22 in FIG. 2).

Referring to FIG. 3, it is decided whether the flag set at a predetermined area in the RAM 34 indicates the absence or presence of rolling at a step 221. In case the flag indicating the rolling is set, a decision is made that the rolling is taking place. Execution of the processing then proceeds to a step 223 where a decision is made as to whether the rolling is converging. In the case of the illustrative embodiment, it is determined that the rolling is converging, when the difference in the damper stroke position between the dampers for the left and right weels is a value not greater than a predetermined one (a value selected from a range of 0.5 to 4 mm) and continues to remain at this value for a predetermined period (a period in the range of 0.25 to 0.5 second).

Accordingly, in order that the decision to the effect that the rolling is converging is to be valid, the following conditions must be satisfied for all the k sampled data (k=e.g. 0, 1, 2, . . . , 40):

$$|d_f(t-Tk)| \leq d_{re}(mm) \tag{1}$$

$$|d_r(t-Tk)| \leq d_{re}(mm) \tag{2}$$

where
$d_f(t-Tk) = y_{fl}(t-Tk) - y_{fr}(t-Tk)$, $d_r(t-Tk) = y_{rl}(t-Tk) - y_{rr}(t-tk)$ and $d_{re}$: rolling convergence decision constant.

The value of $d_{re}$ is in a range of 0.5 to 4 mm and preferably 2 mm. The maximum value of k may be in the range of 25 to 50. When both of the conditions given by the expressions (1) and (2) are satisfied continuously over a period of 0.4 second (k: 0 to 40), a decision is made that the rolling is converging. The processing then proceeds to a step 226.

At the step 226, the flag indicating the rolling is reset and instead the flag indicating no rolling is set. Additionally, when the suspension is not realized by the soft dampers and the soft springs, the command signal for changing-over to the soft dampers and the soft springs is issued. The processing then proceeds to a step 26.

Figure 4:
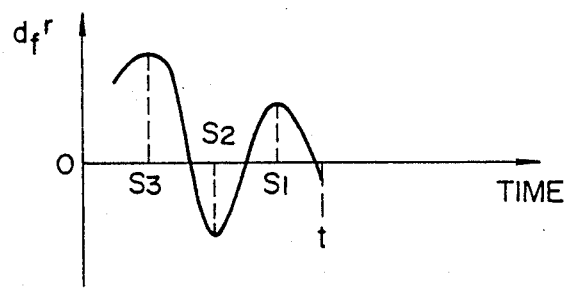
FIG. 4 is a view for illustrating steady motion.

On the other hand, when the decision is made that the rolling is not converging, it is then decided whether the rolling frequency is constant, i.e. whether the rolling motion is steady or not. A method for making this decision will be described by referring to FIG. 4. The decision as to whether the rolling is the steady motion or not is made with the aid of waveform of $d_f(T-Tk)$ or $d_r(t-Tk)$. It is now assumed that the waveform of $d_f(t-Tk)$ is made use of. Referring to FIG. 4, the time points at which maximum values of $|d_f(t-Tk)|$ make appearance are represented by $S_1$, $S_2$ and $S_3$ where $S_3$ is closest to the present instant (i.e. $S_1 > S_2 > S_3$). When the difference between half-periods $(S_1-S_2)$ and $(S_2-S_3)$ lie within the sampling period T (=0.01 second) which is tolerable error in measurement, the decision is made that the motion is steady. More specifically, when $$|(S_1-S_2)-(S_2-S_3)| < 0.01 \text{ (second)}$$

the rolling motion is determined to be steady and the processing proceeds to a step 227. Otherwise, a step 261 is validated. When the suspension is realized by the hard dampers and the hard springs at this time point, nothing is done in this step 261, whereupon the processing proceeds to the step 26 (FIG. 2). If not, the command for changing-over to the hard dampers and hard springs is issued.

At the step 227, the rolling frequency $f_r$ is determined in accordance with $$f_r = 1/(S_1-S_3)(\text{in Hz})$$

Figure 5:
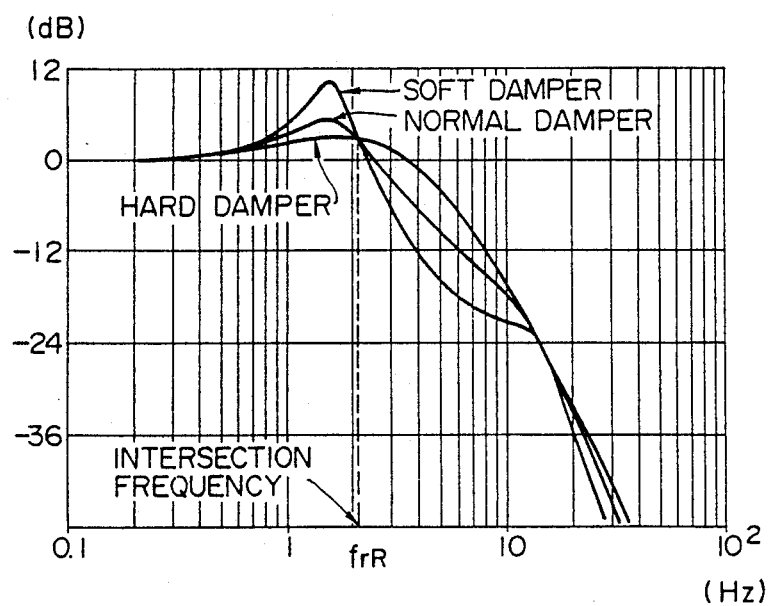
FIG. 5 is a view for graphically illustrating gain characteristic of a transfer function between road surface and a roll angle of the vehicle.

At a step 225, the rolling frequency $f_r$ thus determined is compared with a predetermined rolling reference frequency $f_{rR}$. When $f_{rR} < f_r$, the processing proceeds to a step 228 and otherwise to a step 261. The rolling reference frequency $f_{rR}$ mentioned above is defined as the frequency corresponding to the intersection of the gain curves of the transfer function between the road surface and the roll angle plotted for the cases in which the soft dampers and the hard dampers are used, respectively, as is illustrated in FIG. 5. The rolling reference frequency is in the range of 1 to 3 Hz, as will be seen from FIG. 5. It should however be mentioned that the gain characteristics illustrated in FIG. 5 are only for the purpose of illustration and vary in dependence on the types of the motor cars. Further, the gain characteristics can be obtained through simulation based on a simplified model or through vibration test of actual motor cars.

When the suspension characteristics at the present time point are obtained in the state suspended by the hard dampers and the hard springs, nothing is done in the step 261 and the processing proceeds to the step 26 shown in FIG. 1. Otherwise, the command is issued to change over to the suspension by the hard dampers and the hard springs.

At a step 228, when the suspension is presently realized by the soft damper and the soft springs, nothing is done. The processing proceeds to the step 26 (FIG. 2). Otherwise, the command for changing-over to the suspension by the soft dampers and the soft springs is issued.

At a step 222, decision is made as to whether the rolling begins. In the case of the instant embodiment, it is decided that the rolling occurs when the difference in the damper stroke position between the left and right wheels exceeds a predetermined value (a value between 2 and 10 mm). More specifically, it is decided that the rolling occurs when the condition given by either one of the following expressions is satisfied.

$$|d_f(t)| = |y_{fl}(t) - y_{fr}(t)| > d_{rs} \tag{3}$$

$$|d_r(t)| = |y_{rl}(t) - y_{rr}(t)| > d_{rs} \tag{4}$$

where $d_{rs}$ represents the rolling start decision constant.

The value of $d_{rs}$ lies in a range of 2 to 10 mm and typically 10 mm. When decision is made that the rolling occurs, the processing proceeds to a step 229 where the flag indicating no rolling is reset while the flag indicating "under rolling" is set. Additionally, the flags indicating no unsprung mass vibration, no pitching and no bouncing, respectively, are set.

Next at a step 230, a command for changing-over to the suspension by the hard dampers and hard springs is issued.

Figure 6:
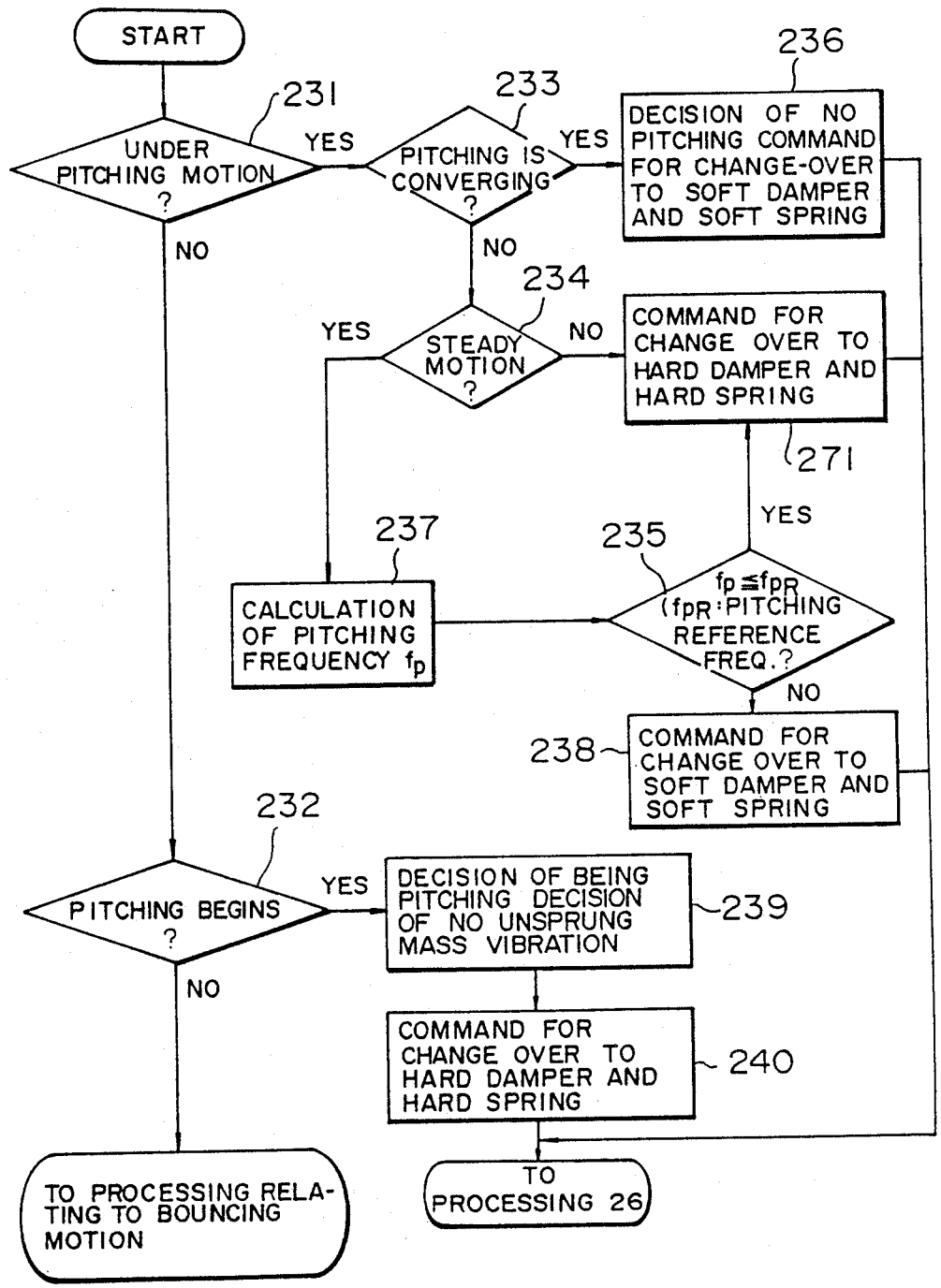
FIG. 6 is a flow chart for illustrating the processing relating to the pitching motion.

On the other hand, when decision is made that no rolling occurs, the processing relating to the pitching motion shown in FIG. 6 is executed.

Now, the processing relating to the pitching motion will be explained by referring to the flow chart shown in FIG. 6.

In the first place, a decision is made whether the flag set at a predetermined area in the RAM indicates "no pitching" or "under pitching". When the flag indicates "under pitching", a decision is made that the pitching is taking place, whereupon the processing proceeds to a step 233. At this step, a decision is made as to whether the pitching is converging. In the case of the illustrative embodiment under consideration, the convergence of the pitching vibration is decided when the difference in the damper stroke between the front and rear wheels is smaller than a predetermined value (a value between 0.5 and 4 mm) and occurs continuously for a predetermined period (duration in the range of 0.25 to 0.5 second).

Accordingly, in order that the decision to effect that the pitching is converging is to be valid, the following conditions must be satisfied for all the k sampled data (k=e.g. 0, 1, 2, . . . , 40):

$$|d_1{}^p(t-Tk)| \leq d_{pe}(mm) \quad (5)$$

$$|d_1{}^p(t-Tk)| \leq d_{pe}(mm) \quad (6)$$

where $d_1{}^r(t-Tk) = \dot{y}_{rl}(t-Tk) - y_{fl}(t-Tk),$ $d_r{}^r(t-Tk) = y_{rr}(t-Tk) - y_{fr}(t-Tk),$ and $d_{re}$: pitching convergence decision constant.

The value of $d_{re}$ is in a range of 0.5 to 4 mm and typically 2 mm. The maximum value of k may be in the range of 25 to 50, by way of example. When both of the conditions given by the expressions (5) and (6) are satisfied continuously over a period of 0.4 second (k: 0 to 40), a decision is made such that the rolling is converging. The processing then proceeds to a step 226.

At the step 236, the flag indicates the pitching is reset, instead of the flag indicating no pitching is set. Additionally, when the suspension is not realized by the soft dampers and the soft springs, the command signal for changing-over to the soft dampers and the soft springs is issued. The processing then proceeds to a step 26.

On the other hand, when the decision is made such that the pitching is not converging, it is then decided whether the pitching period is constant, i.e. whether the pitching motion is steady or not.

Decision as to whether the pitching is steady motion is made through the similar process mentioned hereinbefore with the aid of a waveform $d^p(t-Tk)$ or $d_r^p(t-Tk)$.

When the decision is made that the pitching is not steady, the processing proceeds to a step 271. Otherwise, the processing proceeds to a step 235 after execution of the step 237.

At the step 237, the pitching frequency $f_p$ is determined through the similar procedure for determining the rolling frequency in accordance with $$f_p = 1/(s_1 - S_3)(\text{in Hz})$$

At a step 235, the pitching frequency $f_p$ thus determined is compared with a predetermined pitching reference frequency $f_{pR}$. When $f_{pR} < f_r$, the processing proceeds to a step 238 and, if otherwise, to a step 271. The pitching reference frequency $f_{pR}$ mentioned above is defined as the frequency corresponding to the intersection of gain curves of the transfer function between the road surface and the pitching angle of the motor car plotted for the cases in which the soft dampers and the hard dampers are used, respectively. The pitching reference frequency is in the range of 1 to 3 Hz. This gain characteristics can be obtaining through simulation based on a simplified model or through vibration test of actual motor cars, as described hereinbefore in conjunction with FIG. 5.

At the steps 271 and 238, the processings are executed similarly to the steps 261 and 228.

At the step 232, decision is made as to whether the pitching begins. In the case of the illustrative embodiment, when the difference in the damper stroke position between the front and rear wheels exceeds a predetermined value (typically in the range of 2 to 10 mm), occurrence of the pitching is decided. More specifically, the decision that the pitching occurs is made when the following conditions are satisfied.

$$|d_1{}^p(t)| = |y_{fl}(t) - y_{rl}(t)| > d_{ps} \quad (7)$$

$$|d_r{}^p(t)| = |y_{fr}(t) - y_{rr}(t)| > d_{ps} \quad (8)$$

where $d_{ps}$ represents a pitching start decision constant. The value of $d_{ps}$ is in the range of 2 to 10 mm and typically 10 mm. When the pitching start is decided, the processing proceeds to a step 239 where the flag indicating no pitching is reset while the flag indicating "under pitching" is set. Additionally, the flags indicating no unsprung mass vibration, no rolling and no bouncing, respectively, are set.

Next, at a step 240, a command for changing over to the suspension by the hard dampers and the hard springs is issued.

On the other hand, unless the start of pitching or the under-pitching state is decided, the processing relating to the bouncing motion is carried out.

Figure 7:
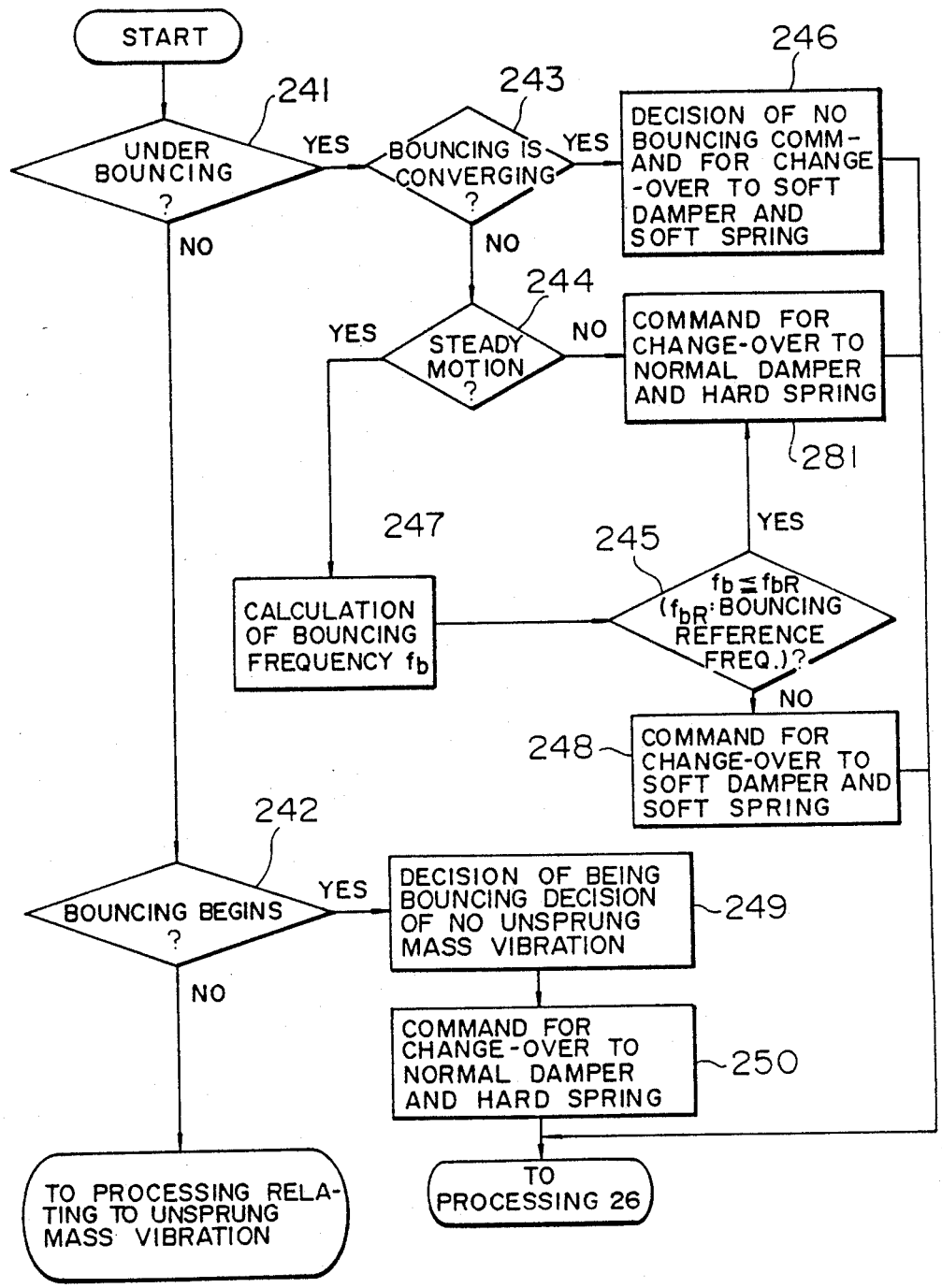
FIG. 7 is a flow chart for illustrating the processing relating to the bouncing motion.

Next, the processing relating to the bouncing motion will be explained by referring to the flow chart shown in FIG. 7.

In the first place, decision is made at a step whether the flag set at a predetermined area in the RAM indicates "no bouncing" or "under bouncing". When the flag indicating "under bouncing" is set, decision is made that the bouncing is taking place, whereupon the processing proceeds to a step 243. At this step, decision is made as to whether the bouncing is converging. In the case of the illustrative embodiment under consideration, the convergence of the bouncing vibration is decided, when displacement in the damper stroke each for the four wheels at a predetermined time interval (between 0.05 and 0.5 second) is smaller than a predetermined value (a value between 0.5 and 4 mm) and occurs continuously for a predetermined period (duration in the range of 0.2 to 0.45 second).

Accordingly, in order that the decision to the effect that the bouncing is converging is to be valid, the following conditions must be satisfied for all the k sampled data (k=e.g. 0, 1, 2, ..., 40):

$$|d_2^b(t-Tk)| \leq d_{be} \quad (9)$$

$$|d_4^b(t-Tk)| \leq d_{be} \quad (10)$$

$$|d_1^b(t-Tk)| \leq d_{be} \quad (11)$$

$$|d_3^b(t-Tk)| \leq d_{be} \quad (12)$$

where $$d_2^b(t-Tk) = y_{rr}(t-Tk) - y_{rr}(t-Tk-A),$$

$$d_4^b(t-Tk) = y_{fr}(t-Tk) - y_{fr}(t-Tk-A),$$

$$d_1^b(t-Tk) = y_{fl}(t-Tk) - y_{fl}(t-Tk-A),$$

$$d_3^b(t-Tk) = y_{rl}(t-Tk) - y_{rl}(t-Tk-A) \text{ and}$$

$d_{be}$: bouncing convergence decision constant.

The value of $d_{be}$ is in a range of 0.5 to 4 mm and typically 2 mm. The maximum value of k may be in the range of 25 to 45, by way of example. Further, the value of A is in the range of 0.05 to 0.5 and typically 0.1. When the conditions given by the expressions (9) to (12) are satisfied continuously over a period of 0.4 second (k: 0 to 40), decision is made such that the bouncing is converging. The processing then proceeds to a step 246.

At the step 246, the flag indicating the bouncing is reset and instead the flag indicating no bouncing is set. Additionally, when the suspension is not realized by the soft dampers and the soft springs, the command signal for changing-over to the soft dampers and the soft springs is issued. The processing then proceeds to a step 26.

On the other hand, when the decision is made such that the bouncing is not converging, it is then decided whether the vibration period of bouncing is constant, i.e. whether the bouncing motion is steady or not.

Decision as to whether the bouncing is steady motion is made through the similar process mentioned hereinbefore in conjunction with the step 224 by making use of the waveform $d_1^b(T-Tk)$, $d_2^b(t-Tk)$, $d_3^b(t-Tk)$ or $d_4^b(t-Tk)$.

When the decision is made that the bouncing is not steady, the processing proceeds to a step 281. Otherwise, the processing proceeds to a step 245 after execution of the step 247.

At the step 247, the bouncing frequency $f_b$ is determined through the similar procedure for determining the rolling frequency $f_r$ in accordance with $$f_b = 1/(S_1-S_3) \text{(in Hz)}$$

At a step 245, the bouncing frequency $f_b$ thus determined is compared with a predetermined bouncing reference frequency $f_{bR}$. When $f_{bR} < f_b$, the processing proceeds to a step 248 and, if otherwise, to a step 281. The bouncing reference frequency $f_{bR}$ mentioned above is defined as the frequency corresponding to the intersection of gain curves of the transfer function between the upward and downward mass displacements of the motor car plotted for the cases in which the soft dampers and the hard dampers are used, respectively. The bouncing reference frequency is in the range of 1 to 3 Hz. This gain characteristics can be obtained through simulation based on a simplified model or through vibration test of actual motor cars, as described hereinbefore in conjunction with FIG. 5.

When the suspension is presently realized by the normal dampers and the hard springs, nothing is done at the step 281 and the processing proceeds to the step 26 (FIG. 2). Otherwise, a command for changing-over to the normal dampers and the hard springs is issued. Parenthetically, the normal damper may be replaced by the hard damper. At the step 248, the similar processing to that of the step 228 is executed.

At the step 242, decision is made as to whether the bouncing begins. In the case of the illustrative embodiment, when the difference in the damper stroke position at one of the four wheels exceeds a predetermined value (typically in the range of 2 to 10 mm), occurrence of the bouncing is decided. More specifically, the decision that the bouncing starts is made when one of the following conditions are satisfied.

$$|d_2^b(t)| = |y_{rr}(t) - y_{rr}(t-A)| > d_{bs} \quad (13)$$

$$|d_4^b(t)| = |y_{fr}(t) - y_{fr}(t-A)| > d_{bs} \quad (14)$$

$$|d_1^b(t)| = |y_{fl}(t) - y_{fl}(t-A)| > d_{bs} \quad (15)$$

$$|d_3^b(t)| = |y_{rl}(t) - y_{rl}(t-A)| > d_{bs} \quad (16)$$

where $d_{bs}$ represents a bouncing start decision constant. The value of $d_{bs}$ is in the range of 2 to 10 mm and typically 4 mm. Further, A is in the range of 0.05 to 0.5 and typically 0.1. When the bouncing start is decided, the processing proceeds to a step 249 where the flag indicating "no bouncing" is reset while the flag indicating "under bouncing" is set. Additionally, the flag indicating no unsprung mass vibration is set.

At a step 250, a command for changing-over to the hard dampers and the hard springs is issued.

Figure 8:
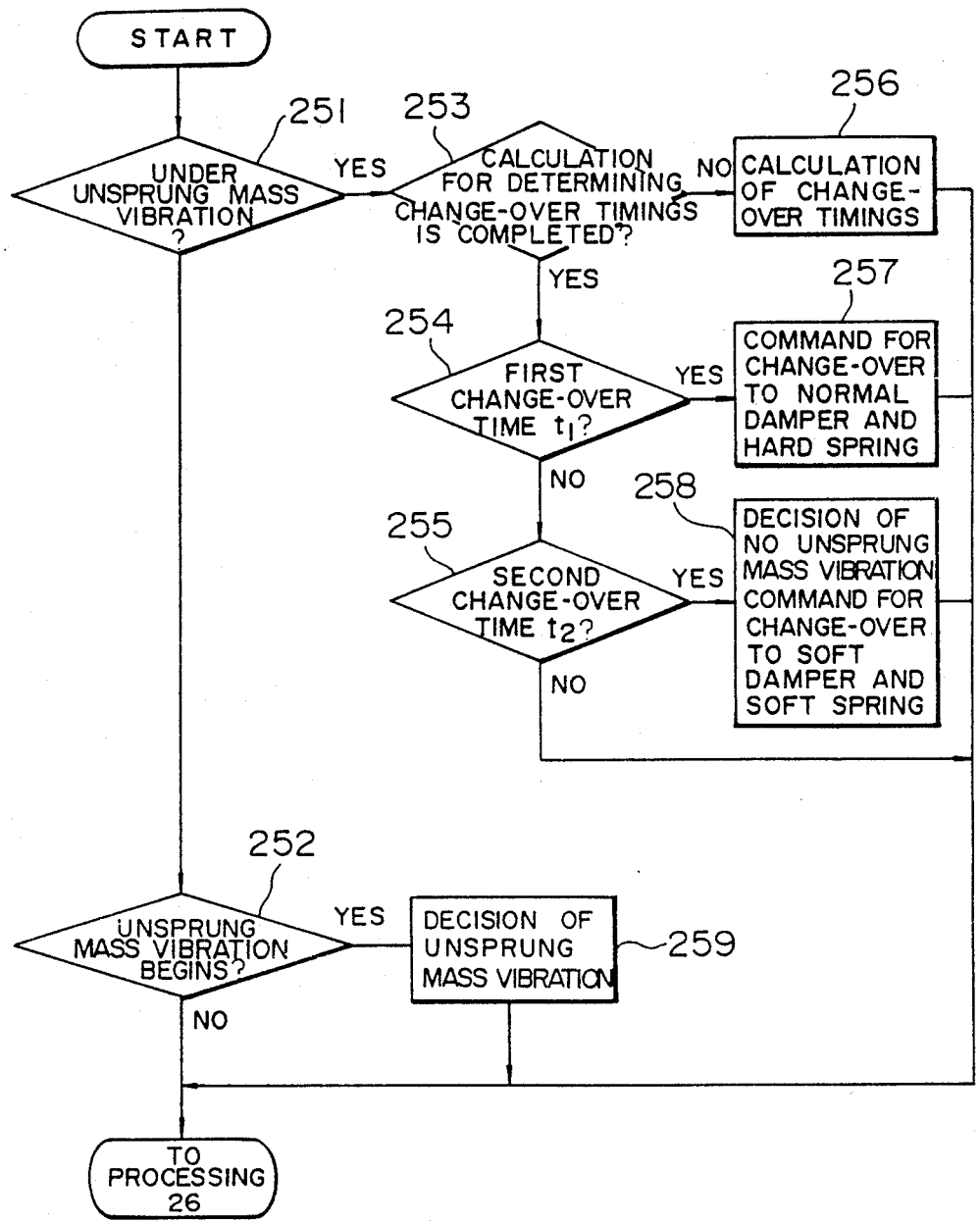
FIG. 8 is a flow chart for illustrating the processing relating to the unsprung mass vibration.

On the other hand, unless the start of the bouncing or the state of bouncing is decided, the processing relating to the unsprung mass vibration illustrated in FIG. 8 is performed.

By the way, a command for changing-over to the hard dampers instead of the normal dampers may be issued at the steps 250 and 281.

Next, description will be directed to the processing relating to the unsprung mass vibration processing.

In the first place, it is decided at a step 251 whether a flag indicating the unsprung mass vibration is set or not. If not, the processing proceeds to a step 253 and, if otherwise, to a step 252. At the step 253, it is decided whether the timing for changing over the suspension state is calculated. If not yet, first and second change-over times $t_1$ and $t_2$ are calculated at a step 256 in accordance with equations described hereinafter. Upon completion of the calculation, a flag indicating the completion of calculation of the change-over timing is set at a predetermined area of the RAM.

The unsprung mass vibration takes place primarily when the motor car passes over a convex joint or a rinsing step or upon passing over a concave joint or a falling step. In the latter case, the damper stroke position of the rear wheel varies in such a manner as illustrated in FIG. 9. In the former case, vibration of the concerned damper stroke position is such as illustrated in FIG. 10. In FIGS. 9 and 10, relative position of the damper for the rear wheel in the vertical direction, i.e. the damper stroke position is taken along the ordinate.

Referring to FIG. 9, when the motor car passes over the concave portion or falling step, the damper stroke position changes over a predetermined value in the positive direction (direction of contraction) at a time point t'.

On the other hand, when the motor car passes over the convex joint or a rising step, the damper stroke position varies over a predetermined value in the negative direction (i.e. direction of stretch) at a time point t', as will be seen in FIG. 10. Thus it is possible to discriminatively determine whether the motor car has passed over the convex portion or the concave portion in a road.

According to the illustrative embodiment of the invention, when the decision is made that the unsprung mass vibration takes place, the time point for changing the suspension characteristics is arithmetically determined on the basis of data concerning the stroke positions of the dampers for the rear wheel and the frequency of unsprung mass natural vibration. More specifically, upon decision of occurrence of the unsprung mass vibration, the damping coefficient and the spring constant are increased at a time point $t_1$ corresponding to the maximum value or minimum value of displacement of the damper stroke position with allowable deviation within 0.01 second. Subsequently, at a time point $t_2$ after lapse of a predetermined time (corresponding to one period of the unsprung mass natural vibration) after the increasing of the spring constant and the damping coefficient, it is regarded that the unsprung mass vibration has converged, whereby the spring constant and the damping coefficient are set to the respective minimum values.

Turning back to FIG. 8, when it is decided at the step 253 that the calculation is completed, then decision is made at a step 254 if the following condition is satisfied:

$$|t_1 - t| \leq T/2 = 0.005 \text{(second)}$$

where
- T: interval for periodical sampling of the damper stroke position
- $t_1$: first change-over time, and
- t: present time point.

When the above condition is satisifed, it is decided that the time point for the first change-over of the suspension characteristics has been reached, whereupon the processing proceeds to a step 257. Otherwise, decision is made that the abovementioned time point is not yet reached, and the processing proceeds to a step 255.

At the step 257, a command for change-over to the normal dampers and the hard springs is issued, being followed by the step 26 (FIG. 2).

At the step 255, it is decided whether the following condition is satisfied:

$$|t_2 - t| \leq T/2 = 0.005 \text{(second)}$$

where $t_2$ represents the second change-over time point.

When the above condition is satisfied, it is decided that the time point for the second change-over of the suspension characteristics has been reached, whereupon the processing proceeds to a step 258. Otherwise, decision is made that the abovementioned second time point is not yet reached, and the processing proceeds to the step 26.

At the step 258, the unsprung mass vibration flag is reset while a flag indicating no unsprung mass vibration is set. Further, a command for change-over to the soft dampers and soft springs is used. Then, the processing proceeds to the step 26 (FIG. 2).

At the step 252, decision is made as to whether the unsprung mass vibration begins or not. In the case of the illustrative embodiment, decision is made that the unsprung mass vibration occurs, when displacement of the stroke position of the damper for one of the rear wheels as measured at a predetermined time interval (in the range of 0.001 to 0.02 second) exceeds a predetermined value (value in the range of 0.2 to 2 mm). More specifically, decision is made that the unsprung mass vibration begins, when one of the following conditions is satisfied:

$$|y_{rr}(t) - y_{rr}(t-T)| > d_{ss} \text{(mm)} \quad (17)$$

$$|y_{rl}(t) - y_{rl}(t-T)| > d_{ss} \text{(mm)} \quad (18)$$

where $d_{ss}$ represents the unsprung mass vibration start decision constant and assumes a value in the range of 0.2 mm to 2 mm, typically 2 mm, and T represents the sampling period of 0.01 second.

When one of the conditions (17) and (18) is satisfied, it is decided that the unsprung mass vibration begins. The processing then proceeds to a step 259. Otherwise, the step 26 (FIG. 2) is executed. At the step 256, the unsprung mass vibration flag and a non-completed change-over time calculation flag are set.

When $$y_{rr}(t) - y_{rr}(t-T) > d_{ss} \text{ or }$$

$$y_{rl}(t) - y_{rl}(t-T) > d_{ss},$$

decision is made that the motor car has passed over the concave joint or falling step. Otherwise, it is decided that the car has passed over a convex joint or rising step.

The calculation for determining the suspension change-over time point described hereinbefore is carried out in the manner mentioned below. Although either one of the stroke position data $y_{rl}(t)$ or $y_{rr}(t)$ of the dampers for the rear left wheel or the rear right wheel may be utilized in this calculation, the following description will be made on the assumption that the data $y_{rr}(t)$ is utilized.

First, it is assumed that the motor car has passed over a concave joint or falling step in a road for the reason that the condition $y_{rr}(t) > y_{rr}(t-T)$ is satisfied. Subsequently, when the following condition is met at a time point $t_0$:

$$y_{rr}(t) \leq y_{rr}(t-T)$$

it is then decided that a peak of the waveform shown in FIG. 9 occurs at the time point $t_0$, and the first and second change-over time points $t_1$ and $t_2$ are determined in accordance with $$t_1 = t - T + \frac{y_{rr}(t-2T) - y_{rr}(t)}{200\{y_{rr}(t) + y_{rr}(t-2T) - 2y_{rr}(t-T)\}} + t_s$$

$$t_2 = t_1 + t_n - t_d$$

where
- $t_s$: duration (second of a half-period of the unsprung mass natural vibration when the soft dampers and the soft springs are employed,
- $t_d$: time (second) required for changing over the damper characteristics on an average, and $t_n$: duration (second) of one period of the unsprung mass natural vibration when the normal dampers and the hard springs are used.

Unless the condition that $y_{rr}(t) \geq y_{rr}(t-T)$ is not satisfied, the processing proceeds to the step 26 (FIG. 2) without calculating the change-over time point.

Now, it is assumed that the motor car has passed over a convex joint or a rising step in a road for the reason. In this case, the condition that $y_{rr}(t) < y_{rr}(t)(t-T)$ is first satisfied. Subsequently, if the following condition is met $$y_{rr}(t) \geq y_{rr}(t-T)$$

it is decided that a peak occurs in the waveform shown in FIG. 10 at a time point $t_0$, and the first and second change-over time points $t_1$ and $t_2$ are determined in accordance with $$t_1 = t - T + \frac{y_{rr}(t-2T) - y_{rr}(t)}{200\{y_{rr}(t) + y_{rr}(t-2T) - 2y_{rr}(t-T)\}} + t_s$$

$$t_2 = t_1 + t_n - t_d.$$

Unless the condition that $y_{rr}(t) \geq y_{rr}(t-T)$ is not satisfied, the processing proceeds to the step 26 (FIG. 2) without performing the calculation for determining the change-over time points.

When the time points $t_1$ and $t_2$ have been determined at the step, the flag indicating that the calculation for determining the suspension characteristic change-over timing has been completed is set. According to the abovementioned calculation of the time points $t_1$ and $t_2$, the change-over of the suspension characteristics is carried out in the vicinity of the maximum point in the distance between the sprung and unsprung mass parts. When the decision is made that the unsprung mass vibration is taking place or begins, the processing proceeds to the step 26 (FIG. 2).

As will now be understood from the foregoing description, according to the teaching of the invention incarnated in the illustrative embodiment, convergence of the vibration is promoted by increasing the damping coefficient and the spring constant as soon as the rolling, pitching or bouncing is detected.

The spring constant and the damping coefficient can be maintained at the respective minimum values independent of the car speed, so long as any of the pitching, rolling, bouncing and the unsprung mass vibration is not detected. Of course, the suspension characteristics may be changed over in dependence on the car speed. By way of example, the damping coefficient and the spring constant may be set at the respective maximum value when the motor car is running at a high speed. Further, since the spring constant and the damping coefficient are decreased as soon as convergence of the rolling, pitching or bouncing is detected, improved comfortableness and manipulatability can be attained.

To cope with the plural types of the vibrations which satisfy the conditions for the relevant decisions, it is preferred to make the decisions with priorities of high to low levels in the order of the rolling, pitching, bouncing and the unsprung mass vibration. Further, when the vibration allocated with a higher priority is decided for the relevant condition before convergence of the given vibration is determined, the high priority vibration is detected. The priority levels assigned to the rolling and the pitching in this order may be reversed.

In the foregoing description, it has been assumed that both the damping coefficient and the spring constant are controlled. However, the invention is not restricted to such an arrangement but can be equally applied to the case where one of the damping coefficient and the spring constant is controlled.

Although the control is performed on the basis of the measured damper stroke position, it is equally possible to provide sensors such as, for example, acceleration sensors for detecting the relative motion between the sprung mass structure and the unsprung mass structure in association with four wheels, respectively, to thereby detect occurrence of both the sprung mass vibration and the unsprung mass vibration. It is also possible to detect the vibration by using sensors for measuring acceleration of sprung mass or load applied thereto.

Further, the suspension control may be performed by detecting both of the rolling and the pitching plus either one of the bouncing or the unsprung mass vibration.

In connection with the bouncing processing, the command signal for decreasing the spring constant and the damping coefficient at the step 248 may be issued at a time point determined by subtracting the average time required for changing over the damper characteristics from a target time point corresponding to the maximum or minimum point in the vibration waveform with tolerable time deviation within 0.01 second.

Although the suspension control is made on the basis of the damper stroke position in the case of the illustrative embodiments, the control may be performed by detecting the rate of displacement of the damper, i.e. the relative speed between the sprung and unsprung mass structures given by $v = y(t) - y(t-T)$.

As will now be apparent from the foregoing description, the present invention makes it possible to perform the adaptive change-over of the suspension characteristic in response to the vibrations of the car body due to variations in the height of road and side wind as well as the unsprung mass vibration due to passing over joints and steps formed in the road, whereby convergence of the vibration to cessation can be promoted. Further, since the damping coefficient and the spring constant are set at the respective minimum value in the absence of vibrations, the comfortableness and manipulatability to drive the car can be significantly improved.

Because inexpensive sensors can be employed, the control system as a whole can be implemented inexpensively.

Further, since the damping coefficient and the spring constant are maintained at the minimum values, respectively, unless the vibrations are not detected, the shock produced upon passing over the joints and the steps can be minimized which contributes to further improvement of the comfortableness and manipulatability.

Due to the simultaneous change over of the suspension characteristics for all the four wheels, convergence of vibration to cessation can be accelerated.

Besides, due to the suspension characteristic changing-over in the vicinity of zero speed of the damper stroke motion for coping with the bouncing and the unsprung mass vibration, the change-over is not accompanied with any appreciable shock, which also contributes to further enhancement of the comfortableness and manipulatability.

Now, the decision that the bouncing starts may be made when both the expressions (13) and (14) are satisfied or both the expressions (15) and (16) are satisfied instead of deciding it when one of the expressions (13) to (16) is satisfied.

We claim:

1. A suspension control apparatus for a vehicle having at least four wheels and a suspension, comprising:
   measuring means for measuring relative motion between sprung mass and unsprung mass at each of the wheels;
   decision means for discriminatively determining occurrence of unsprung mass vibration and occurrence and convergence to cessation of bouncing vibration, and at least one of rolling vibration and pitching vibration on the basis of measurement data from said measuring means; and
   control means for controlling at least one of a damping characteristic and a spring characteristic of a damper and a spring of the suspension, respectively, on the basis of the result of decision made by said decision means.

2. A suspension control apparatus for a vehicle according to claim 1, wherein said measuring means comprises means for measuring acceleration of the sprung mass.

3. A suspension control apparatus for a vehicle according to claim 1, wherein said measuring means comprises a damper stroke position measuring means for measuring a relative position between the sprung mass and the unsprung mass at each of said wheels.

4. A suspension control apparatus for a vehicle according to claim 3, wherein said decision means decides that the rolling vibration takes place when a difference in the damper stroke position between left and right ones of the wheels exceeds a first predetermined value, decides that the pitching vibration takes place when a difference in the damper stroke position between front and rear ones of the wheels exceeds a second predetermined value, decides that the bouncing vibration takes place when a displacement of the damper stroke position for a given one of the wheels during a first predetermined time interval exceeds a third predetermined value, and decides that the unsprung mass vibration takes place when a displacement of the damper stroke position for a given one of the wheels during a second predetermined time interval exceeds a fourth predetermined value.

5. A suspension control apparatus for a vehicle according to claim 3, wherein said control means increases at least one of the damping characteristic and the spring characteristic immediately when the decision is made that the rolling, pitching or the bouncing vibration occurs, while increasing at least one of the damping characteristic and the spring characteristic at a time point located in the vicinity of a maximum or minimum point of the damper stroke position for the rear wheel when the decision is made that the unsprung mass vibration occurs.

6. A suspension control apparatus for a vehicle according to claim 3, wherein said control means sets at a minimum at least one of the damping characteristic and the spring characteristic independently of a speed of the vehicle unless the decision is made that one of the pitching, rolling, bouncing and the unsprung mass vibrations occurs.

7. A suspension control apparatus for a vehicle according to claim 3, wherein said control means changes at least one of the damping characteristic and the spring characteristic simultaneously and to the same value for each of the wheels when the decision is made by said decision means.

8. A suspension control apparatus for a vehicle according to claim 2, wherein said decision means decides that the convergence to cessation of the rolling vibration occurs when a difference in the damper stroke position between right and left ones of the wheels is not greater than a first predetermined value and continues to exist for a first predetermined time, decides that the convergence to cessation of the pitching vibration occurs when a difference in the damper stroke position between front and rear ones of the wheels is not greater than a second predetermined value and continues to exist for a second predetermined time, and decides that the convergence to cessation of the bouncing vibration occurs when a displacement of the damper stroke at each of the wheels in a predetermined time span is not greater than a third predetermined value and continues to exist for a third predetermined time.

9. A suspension control apparatus for a vehicle according to claim 3, wherein said control means decreases at least one of the spring characteristic and the damping characteristic immediately when the decision is made that the convergence to cessation of the rolling, pitching or the bouncing vibration occurs.

10. A suspension control apparatus for a vehicle according to claim 3, wherein said control means determines discriminately the rolling, the pitching, the bouncing and the unsprung mass vibrations with priorities of high to low levels in this order when several conditions for determining the rolling, pitching, bouncing and the unsprung mass vibrations are satisfied, and wherein
    said control means decides that the vibration assigned with high priority occurs when the condition for the vibration of the high priority is satisfied before a vibration of lower priority is decided to be converged to cessation.

11. A suspension control apparatus for a vehicle according to claim 2, wherein said control means determines upon the decision of the occurrence of the unsprung mass vibration the time point for changing over the suspension characteristics on the basis of data of the damper stroke position at the rear wheels and the unsprung mass natural vibration frequency, and decides that the convergence to cessation of the unsprung mass vibration occurs upon lapse of a predetermined time after the spring characteristic or the damping characteristic is increased, to thereby set at least one of the spring characteristic and the damping characteristic to a minimum value.

12. A suspension control apparatus for a vehicle according to claim 11, wherein said predetermined time is equal to one period of the unsprung mass natural vibration.

13. A suspension control apparatus for a vehicle according to claim 3, wherein said measuring means samples the damper stroke position at each of said wheels at a sampling period in a range of 0.001 to 0.04 seconds with a measurement accuracy in a range of 0.2 to 2 mm.

14. A suspension control apparatus for a vehicle according to claim 13, wherein said decision means decides that the convergence to cessation of the rolling vibration occurs when a difference in the damper stroke position between right and left ones of the wheels is not greater than a first predetermined value in a range of 0.5–4 mm and continues to exist for a first predetermined time in a range of 0.25–0.5 seconds, decides that the convergence to cessation of the pitching vibration occurs when a difference in the damper stroke position between front and rear ones of the wheels is not greater than a second predetermined value in a range of 0.5–4 mm and continues to exist for a second predetermined time in a range of 0.25–0.5 seconds, and decides that the convergence to cessation of the bouncing vibration occurs when a displacement of the damper stroke at each of the wheels in a predetermined time span is not greater than third predetermined value in a range of 0.5–4 mm and continues to exist for a third predetermined time in a range of 0.2–0.45 seconds.

15. A suspension control apparatus for a vehicle according to claim 13, wherein said decision means decides that the rolling takes place when a difference in the damper stroke position between left and right ones of the wheels exceeds a first predetermined value in a range of 2–10 mm, decides that the pitching takes place when a difference in the damper stroke position between front and rear ones of the wheels exceeds a second predetermined value in a range of 2–10 mm, decides that the bouncing takes place when a displacement of the damper stroke position for a given one of the wheels during a first predetermined time interval in a range of 0.05–0.5 seconds exceeds a third predetermined value in a range of 2–10 mm, and decides that the unsprung mass vibration takes place when a displacement of the damper stroke position for a given one of the wheels during a second predetermined time interval in a range of 0.001–0.025 seconds exceeds a fourth predetermined value in a range of 0.2–2 mm.

16. A suspension control apparatus for a vehicle according to claim 15, wherein the time point when at least one of the damping characteristic and the spring characteristic is increased in response to the decision that the unsprung mass vibration occurs is within ½ of the sampling period from the time point at which the maximum or minimum point occurs in the damper stroke position for the rear wheel.

17. A suspension control apparatus for a vehicle according to claim 3, wherein said control means decreases at least one of the spring characteristic and the damping characteristic when a decided one of the pitching, rolling or the bouncing vibrations is of a constant frequency that is higher than a predetermined frequency.

18. A suspension control apparatus for a vehicle according to claim 17, wherein said predetermined frequency lies within a range of 1 to 3 Hz at an intersection of gain curves of a transfer function of said decided one of the vibrations relative to change in the height of load, said gain curves being obtained by using dampers of low and high damping coefficients, respectively.

19. A suspension control apparatus for a vehicle according to claim 11, wherein the time point for changing over at least one of the spring characteristic and the damping characteristic in response to the decision of occurrence of the bouncing vibration lies at a time point corresponding to maximum or minimum point of the bouncing vibration.

20. A suspension control apparatus for a vehicle according to claim 19, wherein said control means produces a command for changing-over the suspension characteristics at a time point preceding to said change-over time point by an average response time required for changing over the suspension damper characteristics in response to said command.

21. A method of controlling a suspension for a vehicle having at least four wheels and a suspension, comprising:

measuring relative motion between sprung mass and unsprung mass at each of the wheels;

a step for discriminatively determining occurrence of unsprung mass vibration and occurrence and convergence to cessation of bouncing vibration, and at least one of rolling vibration and pitching vibration on the basis of measurement data provided by said measuring; and a step for controlling at least one of a damping characteristic and a spring characteristic of a damper and a spring of the suspension, respectively, on the basis of the result of a determination made in said determining step.

22. A suspension controlling method for a vehicle according to claim 21, wherein said measuring includes measuring acceleration of the sprung mass.

23. A suspension controlling method for a vehicle according to claim 21, wherein said measuring is performed with a damper stroke position measuring device that measures a relative position between the sprung mass and the unsprung mass at each of the wheels.

24. A suspension controlling method for a vehicle according to claim 23, wherein said determining step includes a step for deciding that the rolling vibration takes place when a difference in the damper stroke position between left and right ones of the wheels exceeds a first predetermined value, a step for deciding that the pitching vibration takes place when a difference in the damper stroke position between front and rear ones of the wheels exceeds a second predetermined value, a step for deciding that the bouncing vibration takes place when displacement of the damper stroke position for a given one of the wheels during a first predetermined time interval exceeds a third predetermined valve, and a step for deciding that the unsprung mass vibration takes place when a displacement of the damper stroke position for a given one of the wheels during a second predetermined time interval exceeds a fourth predetermined value.

25. A suspension controlling method for a vehicle according to claim 23, wherein said controlling step includes a step for increasing at least one of the damping characteristic and the spring characteristic immediately when the decision is made that the rolling vibration, pitching vibration or the bouncing vibration occurs, and a step for increasing at least one of the damping characteristic and the spring characteristic at a time point located in the vicinity of maximum or minimum point of the damper stroke position for the rear ones of the wheels when the decision is made that the unsprung mass vibration occurs.

26. A suspension controlling method for a vehicle according to claim 23, wherein said measuring includes sampling the damper stroke position at each of the wheels at a sampling period in the range of 0.001 to 0.04 seconds with measurement accuracy in the range of 0.2 to 2 mm.

27. A suspension controlling method for a vehicle according to claim 26, wherein said determining step includes a step for deciding that the rolling takes place when a difference in the damper stroke position between left and right ones of the wheels exceeds a first predetermined value in a range of 2–10 mm, a step for deciding that the pitching takes place when a difference in the damper stroke position between front and rear ones of the wheels exceeds a second predetermined value in a range of 2–10 mm, a step for deciding that the bouncing takes place when a displacement of the damper stroke position for a given one of the wheels during a first predetermined time interval in a range of 0.05–0.5 seconds exceeds a third predetermined value in a range of 2–10 mm, and a step for deciding that the unsprung mass vibration takes place when displacement of the damper stroke position for a given one of the wheels during a second predetermined time interval in a range of 0.001–0.025 seconds exceeds a fourth predetermined value in a range of 0.2–2 mm.

28. A suspension controlling method for a vehicle according to claim 26, wherein said determining step includes a step for deciding that the convergence to cessation of the rolling vibration occurs when a difference in the damper stroke position between right and left ones of the wheels is not greater than a first predetermined value in a range of 0.5–4 mm and continues to exist for a first predetermined time in a range of 0.25–0.5 seconds, a step for deciding that the convergence to cessation of the pitching vibration occurs when a difference in the damper stroke position between front and rear ones of the wheels is not greater than a second predetermined value in a range of 0.5–4 mm and continues to exist for a second predetermined time in a range of 0.25–0.5 seconds, a step for deciding that the convergence to cessation of the bouncing vibration occurs when a displacement of the damper stroke at each of the wheels in a predetermined time span is not greater than a third predetermined value in a range of 0.5–4 mm and continues to exist for a third predetermined time in a range of 0.2–0.45 seconds.

* * * * *